United States Patent [19]
Montgomery et al.

[11] 3,735,129
[45] May 22, 1973

[54] METHOD FOR LOCATING THE POSITION OF MEMBERS RELATIVE TO EACH OTHER

[75] Inventors: James William Montgomery; Michael D. Reifel, both of Houston, Tex.

[73] Assignee: Tenneco Oil Company, Houston, Tex.

[22] Filed: Aug. 20, 1971

[21] Appl. No.: 173,535

[52] U.S. Cl..............................250/65, 250/83.3 D
[51] Int. Cl..............................................G01n 23/02
[58] Field of Search..............324/67; 250/65, 83.3 D

[56] References Cited
UNITED STATES PATENTS

| | | | |
|---|---|---|---|
| 2,478,842 | 8/1949 | Schwartz et al. | 250/83.3 D |
| 1,926,327 | 9/1933 | Burrell et al. | 324/67 |
| 2,167,490 | 7/1939 | Ryan | 324/67 |
| 3,106,640 | 10/1963 | Olendorf | 25/65 |

*Primary Examiner*—James W. Lawrence
*Assistant Examiner*—Harold A. Dixon
*Attorney*—Eugene S. Coddou and Carlos A. Torres

[57] ABSTRACT

Energy from a point source is directed through a plurality of non-visible structures having known dimensions in a given plane. Variations in the density of the material traversed by the energy vary the intensity of the energy reaching a photographic film. Within the plane including the energy source and the film, the distance from the source to each of the structures determines the lateral dimensions and the relative position of the structure's image on the film. Given the distance between the source and the film, the lateral dimensions of the structures and the lateral position, size and intensity of the image cast by each of the structures on the film, the relative location of all such structures with respect to the known position of a reference structure may be determined either graphically or mathematically.

The device employed in the practice of the present invention includes a source of radio active energy carried in a camera housing which supports the source at a known, fixed distance from the reference structure. A film holder mounts the film behind the non-visible structures so that energy emitted from the source travels through the structures before striking the film. A small aperture in the camera housing focuses the energy causing it to radiate from a point. In use, the housing is flooded with water, lowered below the water surface and positioned about a subsurface well structure. The water in the housing is replaced with air after the housing is in place to reduce energy attenuation caused by the water.

8 Claims, 3 Drawing Figures

PATENTED MAY 22 1973 3,735,129
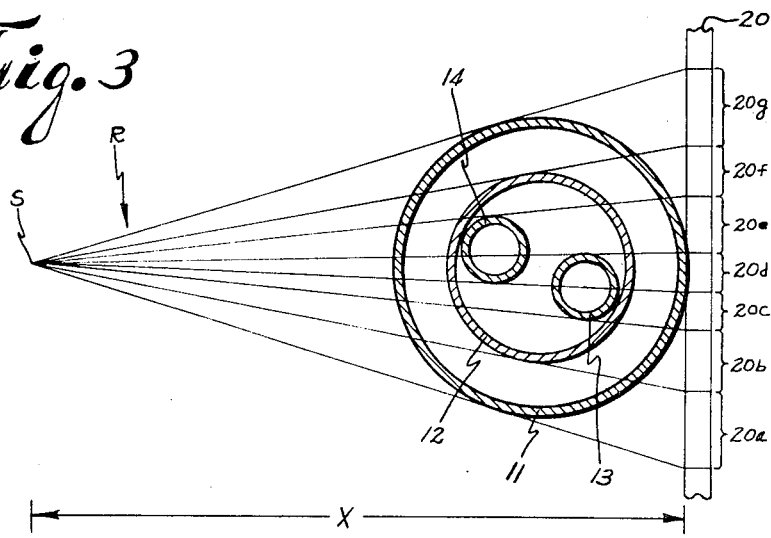
Fig. 3
Fig. 2
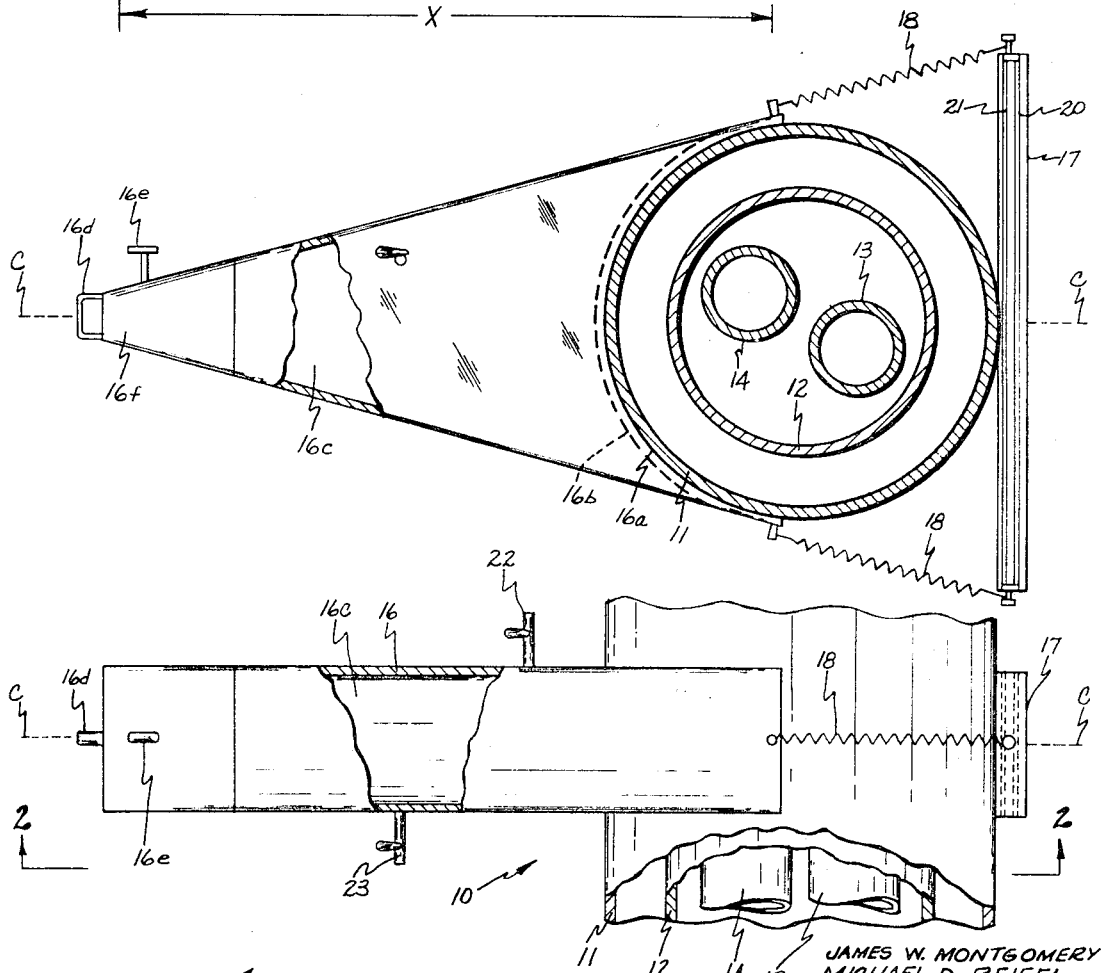
Fig. 1
JAMES W. MONTGOMERY
MICHAEL D. REIFEL
INVENTOR.
BY Carlos A. Torres
ATTORNEY

METHOD FOR LOCATING THE POSITION OF MEMBERS RELATIVE TO EACH OTHER

BACKGROUND OF THE INVENTION

1. Field of the Invention

The present invention relates to means and methods for determining the position of non-visible structures relative to a point having a known location. In a specific application, the present invention relates to means and methods for determining the position in a horizontal plane of tubular metallic well conduits (such as tubing strings and casing strings) with respect to a surrounding casing conductor string where the tubular conduits included within the conductor string extend vertically and have known diameters.

2. Description of the Prior Art

The assignee of the present invention has developed a technique for bringing offshore well blowouts under control by a method which includes opening access windows through the casing string below the water surface and above the mud line. These access openings can be formed by cutting with a torch, mechanical sawing, or with the use of shaped charges which, when detonated cut out the casing wall in a configuration determined by the position and type of charge employed. It is desirable to know the exact position of casing and tubing strings contained within the external casing so that the appropriate shaped charge may be employed and the openings may be formed at the most convenient location. The method and apparatus employed in this technique are more fully described in U.S. Patent application Ser. No. 29,091, filed Apr. 16, 1970 now U.S. Pat. No. 3647000 entitled METHOD FOR CONTROLLING WELL BLOWOUTS and assigned to the assignee of the present invention.

In the past, the position of tubular conduits contained within a surrounding conduit has been determined by the use of separate X-ray exposures made at right angles to each other. When applied to the positioning of submerged well conduits as contemplated in the primary application of the present invention, the equipment associated with X-ray techniques is cumbersome and difficult to handle. Moreover, the requirement for making two right angle exposures increases the time required to obtain the necessary information. Where the two right angle exposures are made simultaneously, appropriate shielding must be employed to prevent interference thus further increasing the complexity of the technique and adding to the possibility that the information obtained will be inaccurate.

The prior art has also employed sonic techniques in an attempt to establish the relative location of structures contained within a surrounding casing or conductor string. Such techniques have generally proven unreliable and provide only an approximation of structural locations.

In the practice of the well control method described before, it is imperative that the relative location of the casing and tubing strings contained within the conductor string be determined as quickly and as accurately as possible. The equipment employed must be capable of being positioned under water by divers who often are dressed in relatively heavy, cumbersome diving gear.

SUMMARY OF THE INVENTION

In the method of the present invention, the relative location of one or more non-visible structures having known dimensions within a given plane is determined with reference to a known reference point in the plane by means of a quick and simple, single exposure technique. In this technique, energy from a point source in the plane is radiated through the structures. Energy passing through the structures strikes a sensitive medium such as photographic film and forms images of the intervening structures on the film's surface.

The intensities of the images vary as a function of the density of the materials traversed by the energy. The dimensions of the images determine the distances of the structures from the source and the locations of the images on the film are employed to establish the lateral positions of the structures. The locations may be obtained through mathematical solution or through graphical scaling. In the preferred form, the images of the film itself are used as markers and full scale graphical scaling is employed to determine the positions of the unknown structures.

As compared with prior art techniques, the method of the present invention provides a straightforward procedure which affords significant time savings, and eliminates the danger associated with simultaneous right angle exposures to X-rays. The apparatus of the present invention includes a source of energy which preferably is radium or other radio active substance. The source is located at one end of a camera housing and the other end of the housing is configured to conform to the tubular structure to which it is attached. The radio active material within the housing is confined within a suitable shielded structure until a manually controlled shutter is moved to open an aperture through which energy from the source may be focused. In the preferred form of the invention, the aperture cooperates with the source to provide a point source. The source is fixed with respect to the structures to be located by engagement between the camera housing and the reference structure. Suitable waterproofing seals or packing may be provided along the area of contact between the housing and the reference structure. Vent cocks are provided so that the internal housing area may be evacuated of water and filled with air.

Two film strips with different exposure rates are positioned on the opposite side of the energy source in a film holder so that the structures to be located are between the film strips and the source. The film holder is held in position by suitable attachment with the camera housing. Energy traversing the structures produces images on the film which vary in light intensity dependent upon the density of the structures traversed by the energy. The density variations produce differences in images, colors ranging between a light gray to black with adjoining lines between images of different shades corresponding to the intersection with the film of projection lines extending from the point source, tangent to the external boundaries of the non-visible structures.

By analyzing the size, position and color of the images, and knowing the position of the point source and the position of the film, structures having known dimensions within the plane of the measurement may be positively located.

The foregoing and other features and advantages of the present invention will be more fully appreciated from the following specification, drawings and related claims.

BRIEF DESCRIPTION OF THE DRAWINGS

FIG. 1. is a partial vertical elevation, partially broken away illustrating the assembly of the present invention positioned about a well structure below the surface of the water;

FIG. 2 is a view taken along the line 2-2 of FIG. 1; and

FIG. 3 is a schematic representation illustrating the operation of the apparatus and method of the present invention.

DESCRIPTION OF THE PREFERRED EMBODIMENTS

With reference to FIG. 1, the apparatus of the present invention is illustrated generally at 10 in position about a tubular conductor casing string 11 surrounding an innercasing 12 which in turn surrounds two tubular production strings 13 and 14. It will be appreciated that the position of the conductor casing 11 is known and may function as a reference structure while the positions of the structures 12, 13 and 14 are unknown and are to be located with respect to the reference structure. The apparatus 10 includes a camera housing 16 and a film holder 17 secured to each other by springs 18.

Comparing FIGS. 1 and 2, it may be appreciated that the enclosure of camera housing 16 is substantially triangular in one dimension and includes a curved end 16a adapted to engage and conform to the external surface of the conductor casing 11. A suitable packing or sealing material 16b is disposed adjacent the intersection of the box end 16a and the conductor casing 11 to provide a leakproof seal preventing water from entering internal portions 16c of the camera housing.

The remote end of the camera housing is provided with a handle 16d which is employed during the positioning of the housing 16 about the conductor pipe. A manually operable shutter control 16e is employed to regulate opening and closing of a small circular aperture (not shown) which exposes a radio active material (not illustrated) contained within a shielded enclosure 16f formed at the remote end of the housing 16. The aperture and energy source align substantially along the dotted line C so that with the shutter opened, energy emitted from the aperture opening into the energy source radiates outwardly from the source in the form of rays diverging from a point source. This is represented schematically in FIG. 3 wherein the rays are depicted generally at R and the point source location is indicated schematically at S.

Before lowering the apparatus 10 into the water, the area 16c is filled with water so that the device will tend to sink through the water. Once the desired subsurface location has been reached, the box portion 16 is positioned as indicated in FIG. 1 and the springs 18 are snapped onto the film holder 17. The springs 18 maintain the film holder and film at a fixed location relative to the conductor casing 11 and relative to the point source S.

Two elongate strips of film 20 and 21 are positioned in the film holder 17. The strips are preferably protected by being encased in a waterproof bag or covering. Preferably, the film strips 20 and 21 have different exposure rates so that increased information may be obtained from a fixed exposure time. As will be seen, the film functions as a measuring means to indicate the intensity of energy passing through the structures.

With the apparatus in the position illustrated in FIGS. 1 and 2, a vent cock 22 is opened and air is applied to a second vent cock 23 to replace water contained within the area 16c with air. The water is replaced with air since it does not attenuate the energy radiated from the point source S to the same extent as water. Suitable weights (not illustrated) or other means may be employed to prevent the camera housing 16 from rising in the water due to the increased buoyancy caused by filling the area 16c with air. When the area 16c has been evacuated of water, the cocks 22 and 23 are closed and the shutter control 16e is opened to permit energy from the source S to radiate through the camera housing and through the structures 11, 12, 13 and 14 causing images of the structures to be formed on the film strips 20 and 21.

The various images appearing on the film 20 and 21 are depicted schematically in FIG. 3 as 20a through 20g. The color of the images varies as a function of the density of the matter traversed by the energy. Image 20d is the lightest in color since the density of the matter between it and the source was greater than that between the source and the other images. The locations of density change lines marking the separation between images 20a through 20g are employed to locate the relative lateral positions of members 12, 13 and 14 with respect to the surrounding conductor casing 11. Thus, as can be seen by reference to FIG. 3, lines projected from the point source S tangent to the external surfaces of the structures 11, 12, 13 and 14 strike the film strip images at the density change lines between adjacent images.

Given the distance X and the external dimensions of structures 11, 12, 13 and 14, the relative location of each of these structures can be determined from the positioning and size of the images 20a through 20f. Such a solution may be effected either through graphical scaling or through mathematical solution.

Where full scale graphical solutions are employed, the film 20 (or 21) may be positioned at a fixed distance from a point representing the point source S with lines representing the energy rays R drawn from the point source to the density change lines between images. By this means, a full scale radiating grid is formed and full sized templates of the structures 11, 12, 13 and 14 may then be moved between the grid lines which strike the exposed film at the density change lines until the templates are tangent to the grid lines. The resulting position of the templates provides a precise indication of the location of each of the corresponding structures.

In testing, using a 100 curie iridium 192 element for the source and two 21" strips of Ansco A and DuPont NDT-75 film for the sensitive mediums, suitable images were obtained on the film in approximately 15 to 30 minutes.

With the apparatus and method of the present invention, it is evident that the positions of tubing and casing strings within a supporting structure can be accurately determined preliminary to the application of shaped charges or other cutting means to remove portions of the surrounding structure. The technique permits the formation of windows through the casing at the point where the tubing strings are most conveniently located and also permits placement of charges and cutting mechanisms at a position which will minimize danger to the interlying structures.

While the apparatus 10 has been described as employing a linear film holder with a source spaced from the conductor casing, it will be appreciated that the film holder and film may be curved or may be wrapped about the tubular conductor string or the source may be directly adjacent the conductor string.

The foregoing disclosure and description of the invention is illustrative and explanatory thereof, and various changes in the size, shape and materials as well as in the details of the illustrated construction may be made within the scope of the appended claims without departing from the spirit of the invention.

We claim:

1. A method of locating the position within a given plane of one or more first structures having known dimensions along a given direction in said plane comprising the steps of:
    a. radiating energy from a source of radiant energy positioned at a first location in said plane where said first location is known with respect to a known reference point in said plane;
    b. positioning measuring means along a second location in said plane where said second location is known with respect to said reference point, said measuring means being located to intercept the energy passing through said first structures and including means for providing images of said first structures which images vary in intensity depending upon the density of matter traversed by said energy, and vary in dimension within said plane depending upon the dimensions within said plane of said first structures and the distances in said plane of said first structures from said source and vary in location in said plane depending upon the locations of said first structures in said plane; and
    c. solving for the planar position of said first structures with respect to said reference point using the planar dimensions and positions of said images, the planar distance between said source and said measuring means, and the planar dimensions of said first structures.

2. A method as defined in claim 1 including the step of solving for the planar positions of said first structures by graphical scaling in which said images, said energy source and said reference point are depicted in a graphical representation and representations of said first structures are positioned on said graphical representation at the locations required to correspond to said images.

3. A method as defined in claim 1 including the steps of:
    a. employing photographic film for said measuring means; and
    b. employing radium as said energy source whereby radiated energy from said radium source passing through said first structures forms light variant images on said photographic film.

4. A method of locating the lateral position of one or more tubular members extending axially within a surrounding body where the lateral dimensions of said tubular members and said surrounding body are known comprising the steps of:
    a. radiating energy from a source point through said tubular members and said surrounding body along a lateral plane which is substantially perpendicular to the axial direction of said tubular members;
    b. exposing a sensitive measuring means to the energy within said plane transmitted through said surrounding body and said tubular members for forming images on said measuring means which images vary in intensity depending upon the density of the matter traversed between said source point and said measuring means; and
    c. solving for the lateral positions of said tubular members within said surrounding body using the lateral dimension of said tubular members, the distance between said source point and said measuring means and the dimensions and position within said lateral plane of the images cast by said tubular members.

5. A method as defined in claim 4 wherein:
    a. said source point energy is derived from a radio active material; and
    b. said measuring means includes photographic film.

6. A method as defined in claim 4 wherein the locations of said tubular members are determined by graphical scaling.

7. A method as defined in claim 5 wherein the locations of said tubular members are determined by graphical scaling.

8. A method as defined in claim 5 wherein the locations of said tubular members is obtained by mathematical solution.

* * * * *